United States Patent Office 2,724,639
Patented Nov. 22, 1955

2,724,639

PROCESS OF PRODUCING BARIUM HYDROXIDE

Fredrik W. de Jahn, New York, N. Y., assignor of one-half to Alan N. Mann, Scarsdale, N. Y.

No Drawing. Application February 1, 1954,
Serial No. 407,597

5 Claims. (Cl. 23—186)

Throughout the whole history of modern chemical industry, there has been only one commercial process for producing barium hydroxide from barium sulfate. This involves furnacing the barium sulfate with an excess of carbon to produce barium sulfide, after which the barium sulfide is leached out with water and then treated either with $CO_2$ gas or with an alkaline carbonate to precipitate barium carbonate. It is recognized, however, that various sulfur compounds remain mixed with the carbonate, and eliminating the sulfur is difficult and expensive. The precipitated barium carbonate when it is finally cleaned is heated in an electric furnace with pure carbon to form barium oxide which of course can be dissolved in water to form barium hydrate.

In accordance with my invention, it is possible to produce barium hydroxide at just a fraction of the former cost. This is based upon my discovery that by maintaining proper conditions it is possible to react barium sulfate (barytes) and iron sulfide (pyrites) to obtain a residue which consists of a mixture of iron oxide and barium oxide. Apparently little, if any, of the iron and barium react to form the water-insoluble barium ferrite, and no sulfide sulfur remains.

The reaction between barytes and pyrites has been tried in the past but has been reported to be inoperative due to the fact that the material fuses without any appreciable reaction taking place. (See Zeitschrift Anorganische und Allgemeine Chemie 1922–1924, page 342.)

I have discovered that it is possible to carry on the reaction without substantial fusion at a temperature ranging from about 750° C. up to the fusing point which is in the neighborhood of about 1100° C. provided that not only steam is present but that the steam is passed through the reaction mass with sufficient velocity so that the equilibrium of gases is continuously being upset so as to accelerate the reaction.

The proportions of barium sulfate (barytes) and iron sulfide (pyrites or pyrrhotite) is not critical but if the percentage of barium oxide is too low, it means that an undue amount of material has to be treated. On the other hand, if the proportion of barium sulfate is too high, the residue may contain a large percentage of unconverted barium sulfate. In general, one should use between 1 and 5 mols of iron sulfide for each mol of barium sulfate and a preferred range is between about 2 and 3 mols of the iron sulfide for each mol of barium sulfate. In my copending application, Serial No. 482,446, filed January 18, 1955, I disclose conditions where very small proportions of barium sulfate can be employed with iron sulfide, but in such case the barium sulfate is primarily used as a binder.

As regards the amount of steam to be employed, I believe that the reaction takes place as, for example, according to the following formula (which is very much simplified):

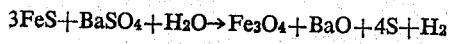

$$3FeS + BaSO_4 + H_2O \rightarrow Fe_3O_4 + BaO + 4S + H_2$$

From this reaction it would appear that only a relatively small amount of steam need be present but I have found that a large excess of steam must be used and this must be kept moving through the reaction mass at a substantial velocity. For example, there should be at least three pounds of steam employed for each pound of sulfur in the mix and preferably the amount of steam employed should be even greater, say about ten times the weight of the sulfur. The velocity should be at least 2 feet per second and preferably very much higher; for example, it may range from 10 up to 25 feet per second or higher if commercial conditions permit.

As previously stated, the reaction seems to begin at about 700° C. and to be appreciable at about 750° C. The reaction can be substantially completed at temperatures ranging up to about 950° C. but higher temperatures up to, but short of, the fusion point are not objectionable.

As an example of my process, barium sulfate and iron pyrites were ground together in the ratio of 3 mols of pyrites to one mol of barium sulfate until the material would pass through a 325 mesh screen. About 10% of water was added to the finely ground mixture and the mass was formed into small pellets. These pellets were heated to a temperature of about 120° C. at which temperature they hardened and became physically strong. These pellets were charged into an electric furnace externally heated by electrical resistance and a large excess of steam (more than ten times the weight of the sulfur present) was passed through the charge at a velocity of about 25 feet per second. There was some evolution of what I believe was labile sulfur at about 550° C., but what appeared to be the reaction sulfur started to come off at about 700° C. and was appreciable at 750° C. The temperature was carried up to 925° C. The condensed steam was found to contain substantial quantities of actual sulfur and the uncondensed gases contained a mixture of $H_2S$ and $SO_2$ which appeared to be approximately in the proportion of 2 mols of $H_2S$ to one mol of $SO_2$. This gas mixture can be easily converted into elemental sulfur by known processes. After about 6 hours at 925° C. the evolution of sulfur stopped and the furnace was allowed to cool off.

When the furnace was opened, the pellets retained their original shape but were much lighter and more porous than when put into the furnace. On analysis the pellets were found to contain no sulfur in the form of sulfide and when the pellets were treated with dilute hydrochloric acid, 85% of the original barium was dissolved out showing that it had been converted to barium oxide.

The bellets of barium sulfate and iron sulfide are of adequate strength so that they can be charged into a continuous operating shaft furnace and in such case the process is carried out by superheating the steam and introducing the necessary heat units into the mass by that medium. It must be borne in mind that in this operation it is advisable that no appreciable percentage of ordinary products of combustion should be present, as $CO_2$ gas would tend to interfere with the reaction and dilution of the gases tends to interfere with recovery of the sulfur which is a valuable incident of my process. For this latter reason, if oxygen is admitted to the furnace to improve the heat balance it is advisable to use straight oxygen rather than air.

The pellets from which the sulfur has been driven out are removed continuously from the shaft furnace and then with a minimum exposure to air may be dropped into water and ground, after which they are heated in water under pressure, say to a temperature of about 150° C. This extracts the converted barium in the form of barium hydroxide.

While this description indicates methods that may be employed for carrying out my invention, it is to be understood that it is not limited to any particular form of apparatus.

What I claim is:

1. The process of producing barium oxide which comprises mixing together crushed barium sulfate and crushed iron sulfide in the proportion of between 1 and 5 mols of iron sulfide for each mol of barium sulfate, heating the mixture to a temperature of between 750° C. and 1100° C., preventing the mass from fusing by passing steam through the mixture in an amount equal to at least 3 parts by weight of steam for each part by weight of sulfur in the mixture and at a velocity of at least 2 feet per second whereby equilibrium conditions are upset and the sulfur is largely driven off with the production of iron oxide and barium oxide and extracting the barium oxide with water in the form of barium hydroxide.

2. A process as specified in claim 1 in which the proportion of iron sulfide to barium sulfate is approximately from 2 to 3 mols of iron sulfide for each mol of barium sulfate.

3. A process as specified in claim 1 in which the amount of steam employed is at least ten times the weight of the sulfur in the mixture.

4. A process as specified in claim 1 in which the mass is heated to a temperature of between 750° C. and 950° C. and the heating is continued until the evolution of sulfur substantially ceases.

5. The method of producing barium hydroxide which comprises mixing together finely ground barium sulfate with iron sulfide in the proportion of between about 2 to 3 mols of iron sulfide for each mol of barium sulfate, wetting the powdered mixture and forming it into pellets, drying such pellets and passing them through a furnace heated to a temperature of between 750° C. and 950° C. while forcing steam through the mass at a velocity of from 10 to 25 feet per second and in an amount equal to at least 3 parts by weight of steam for each part by weight of sulfur treated, whereby equilibrium conditions are upset and the sulfur is largely driven off, collecting the solid residue comprising barium oxide and iron oxide, crushing it and extracting the barium oxide with water in the form of barium hydroxide.

References Cited in the file of this patent

UNITED STATES PATENTS

| 1,939,033 | Bacon et al. | Dec. 12, 1933 |
| 2,039,645 | Hechenbleikner | May 5, 1936 |

FOREIGN PATENTS

| 177,613 | Germany | Oct. 30, 1906 |